No. 880,286. PATENTED FEB. 25, 1908.
W. F. ELLIOTT.
CORN SHELLER.
APPLICATION FILED SEPT. 19, 1907.

Witnesses William F. Elliott, Inventor,

By

Attorney

UNITED STATES PATENT OFFICE.

WILLIAM F. ELLIOTT, OF DE KALB, ILLINOIS.

CORN-SHELLER.

No. 880,286.  Specification of Letters Patent.  Patented Feb. 25, 1908.

Application filed September 19, 1907. Serial No. 393,710.

*To all whom it may concern:*

Be it known that I, WILLIAM F. ELLIOTT, a citizen of the United States, residing at De Kalb, in the county of Dekalb and State of Illinois, have invented a new and useful Corn-Sheller, of which the following is a specification.

The invention relates to improvements in corn shellers.

The object of the present invention is to improve the construction of corn shellers, and to provide a simple and inexpensive device, designed particularly for use by women and children to shell corn in small quantities, and adapted to take the place of one of the natural corn cobs usually employed when corn is shelled by hand, and capable of providing a more rapid and effective means of shelling corn without injuring the hands.

A further object of the invention is to provide a corn sheller, having the general configuration of a corn cob and adapted to be used with greater facility than the same when shelling corn by hand.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
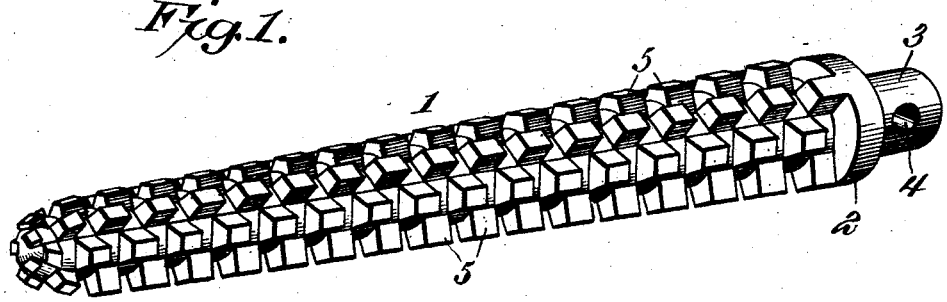
Figure 2:
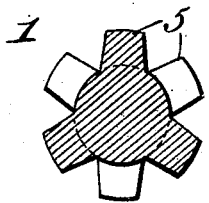

In the drawing:—Figure 1 is a perspective view of a corn sheller, constructed in accordance with this invention. Fig. 2 is a transverse sectional view of the same.

Like numerals of reference designate corresponding parts in all the figures of the drawing.

The corn sheller, which is designed to be constructed of metal, or other suitable material, consists of a substantially cylindrical body 1, having a slight taper and provided at the larger end with a smooth annular portion or collar 2 and having a reduced cylindrical extension 3, which is also smooth. The extension 3 is provided with a perforation 4, adapted to receive a cord, or other suitable means for enabling the corn sheller to be hung up when not in use, and the smooth end of the corn sheller forms a handle or grip portion to enable the device to be readily held in the hand without hurting the same.

The corn sheller is provided with an annular series of longitudinal rows of spaced teeth 5, extending from the collar to the other end of the body. The teeth 5, which are substantially rectangular in cross section, are blunt so as not to hurt the hand, and the teeth of each row are arranged opposite the spaces or intervals between the teeth of the adjacent rows. The teeth are slightly tapered towards their outer ends, and they gradually decrease in size from the larger end of the body to the smaller end of the same to conform to the taper of the corn sheller.

Corn is most frequently shelled by hand by taking an ear of corn and a cob and rubbing one against the other. The device is adapted to take the place of the cob in such operation, and it enables corn to be more rapidly removed from a cob than when a cob is used. The ear of corn is held in the left hand and the corn sheller, which forms a rasp, is held in the right hand, and it will enable ladies and children to quickly remove corn from a cob without hurting their hands.

Having thus fully described my invention, what I claim as new and desire to secure by Letters Patent, is:—

1. A hand corn sheller consisting of a solid substantially cylindrical tapering body smooth at one end and rounded at the other and provided throughout its length with blunt projecting teeth gradually decreasing in size with the diameter of the body from the smooth portion to the rounded end thereof, said body being also provided with teeth projecting from its rounded end.

2. A hand corn sheller consisting of a solid substantially cylindrical tapering body having a smooth portion at its large end and provided with longitudinal rows of blunt teeth gradually decreasing in size with the diameter of the body from the smooth portion to the small end, the teeth of each row being arranged opposite the intervals or spaces between the teeth of the contiguous rows.

3. A hand corn sheller consisting of a substantially cylindrical body provided with longitudinal rows of blunt teeth, the teeth of each row being arranged opposite the intervals or spaces between the teeth of the contiguous rows, said body being provided at one end with a smooth annular portion or collar and having a reduced extension.

4. A hand corn sheller consisting of a substantially cylindrical tapering body provided with a series of longitudinal rows of blunt tapering teeth decreasing in size from the large end of the body to the other.

In testimony that I claim the foregoing as my own, I have hereto affixed my signature in the presence of two witnesses.

WILLIAM F. ELLIOTT.

Witnesses:
 JNO. H. JARBOE,
 GEORGE A. PIERCE.